(12) United States Patent
Massaccesi et al.

(10) Patent No.: US 6,458,057 B2
(45) Date of Patent: Oct. 1, 2002

(54) MOTOR WHEEL FOR DRIVING THE DRIVING WHEEL OF AN INDUSTRIAL VEHICLE AND THE LIKE

(75) Inventors: Gianni Massaccesi, Vigodarzere; Stefano Pivetti, Carpi, both of (IT)

(73) Assignee: S.O.M. S.p.A., Cavriago (IT)

( * ) Notice: Subject to any disclaimer, the term of this patent is extended or adjusted under 35 U.S.C. 154(b) by 60 days.

(21) Appl. No.: 09/731,823

(22) Filed: Dec. 8, 2000

(30) Foreign Application Priority Data

Dec. 17, 1999 (IT) .......................................... MI99A2636

(51) Int. Cl.⁷ .......................... F16H 3/44; F16H 37/06; B60K 17/04
(52) U.S. Cl. ........................ 475/302; 475/330; 180/372
(58) Field of Search ................................. 475/302, 321, 475/330; 180/65.5, 65.6, 65.7, 372

(56) References Cited

U.S. PATENT DOCUMENTS

| | | | | |
|---|---|---|---|---|
| 2,488,756 A | * | 11/1949 | Baker | 475/302 X |
| 3,429,200 A | * | 2/1969 | Green | 475/330 |
| 3,770,074 A | * | 11/1973 | Sherman | 180/372 X |
| 3,812,928 A | * | 5/1974 | Rockwell et al. | 180/65.5 |
| 4,020,716 A | * | 5/1977 | Toth et al. | 180/372 X |
| 4,406,340 A | * | 9/1983 | Gennaux | 180/65.5 |
| 4,418,777 A | * | 12/1983 | Stockton | 180/65.5 |
| 4,711,136 A | * | 12/1987 | Yoshinaka et al. | 475/302 X |
| 4,799,564 A | * | 1/1989 | Iijima et al. | 180/65.5 |
| 5,382,854 A | * | 1/1995 | Kawamoto et al. | 180/65.6 X |
| 5,397,282 A | * | 3/1995 | Weidman | 475/321 X |
| 5,478,290 A | * | 12/1995 | Buuck et al. | 475/330 X |
| 5,569,034 A | * | 10/1996 | Meller et al. | 433/105 |
| 5,888,165 A | * | 3/1999 | Besier et al. | 475/204 |
| 6,358,176 B1 | * | 3/2002 | Nauheimer et al. | 180/65.6 X |

* cited by examiner

Primary Examiner—Rodney H. Bonck
Assistant Examiner—Roger Pang
(74) Attorney, Agent, or Firm—Guido Modiano; Albert Josif; Daniel O'Byrne

(57) ABSTRACT

A motor wheel for driving the driving wheel of an industrial vehicle and the like, comprising upstream of a two-stage rotary-ring reduction unit, a gearbox with fixed-ring epicyclic gear train, with at least two positions which respectively correspond to the high or travel speed and to the low or working speed. A parking brake is further provided downstream of the gearbox with respect to the motion input.

11 Claims, 3 Drawing Sheets

US 6,458,057 B2

MOTOR WHEEL FOR DRIVING THE DRIVING WHEEL OF AN INDUSTRIAL VEHICLE AND THE LIKE

BACKGROUND OF THE INVENTION

The present invention relates to a motor wheel for driving the driving wheel of an industrial vehicle and the like.

As it is known motor wheels for driving the driving wheel of an industrial vehicle, for example of the road-paver type, in some applications have a built-in two-speed gearbox which allows to obtain two different speeds, i.e., a low or working speed and a high or travel speed.

The motor wheel currently in use generally has a gearbox provided by means of a single-stage epicyclic assembly arranged upstream of a two-stage fixed-ring epicyclic assembly which is actuated by means of two hydraulic clutches, which in practice provide the two required operating speeds.

Generally speaking, when one clutch is actuated, motion is transferred directly from the input sun gear to the output carrier, thus obtaining a direct transmission which provides the direct speed, while when the other clutch is closed the ring gear of the epicyclic gear system is locked, providing a fourfold reduction ratio which corresponds to the low speed.

Both clutches are of the negative-actuation type, i.e., have a clutch which is normally closed by springs and is opened by a hydraulic pressure, so that when there is no actuation pressure the two clutches are both closed, providing the parking brake function.

This type of operating layout suffers some problems; in particular, the clutches are usually dimensioned for coupling when the machine is not moving, since it is not necessary to select the operating range while the machine is moving; however, the fact of having a drive operated by means of clutches which in practice do not clash, allows an improper use of said clutches while the machine is moving, accordingly leading to rapid wear/burnout of the clutches.

Moreover, providing the drive by means of clutches is a delicate and expensive approach with considerable mechanical complexities which introduce significant costs for functions which in practice are not necessary.

SUMMARY OF THE INVENTION

The aim of the present invention is to solve the above noted problem by providing a motor wheel for driving the driving wheel of an industrial vehicle and the like which allows to shift between the working speed and the transfer speed without having to resort to the use of two clutches but simply by providing a mechanical drive with hydraulic preselection which has a very low cost and simplifies not only manufacture but also its operation.

Within this aim, a particular object of the invention is to provide a motor wheel in which the flow-rate and the actuation pressure of the drive do not affect the operation of the gearbox, since they act only during preselection.

Another object of the present invention is to provide a motor wheel in which shifting can be requested regardless of the loading conditions of the gearbox, since if the gear system is subjected to torque, as a consequence of the shifting request, said gearbox remains set to the current speed until torque conditions occur which allow shifting to the preselected speed.

Still another object of the invention is to provide a motor wheel for driving the driving wheel of an industrial vehicle and the like which, by means of its particular constructive characteristics, is capable of giving the greatest assurances of reliability and safety in use.

These and other objects which will become better apparent are achieved by a motor wheel for driving the driving wheel of an industrial vehicle and the like, according to the invention, characterized in that it comprises, upstream of a two-stage rotary-ring reduction unit, a gearbox with fixed-ring epicyclic gear train, with at least two positions which respectively correspond to the high or travel speed and to the low or working speed, a parking brake being further provided downstream of said gearbox with respect to the motion input.

BRIEF DESCRIPTION OF THE DRAWINGS

Further characteristics and advantages of the present invention will become better apparent from the following detailed description of a preferred but not exclusive embodiment of a motor wheel for driving the driving wheel of an industrial vehicle and the like, illustrated only by way of non-limitative example in the accompanying drawings, wherein.

DESCRIPTION OF THE PREFERRED EMBODIMENTS

Figure 1:
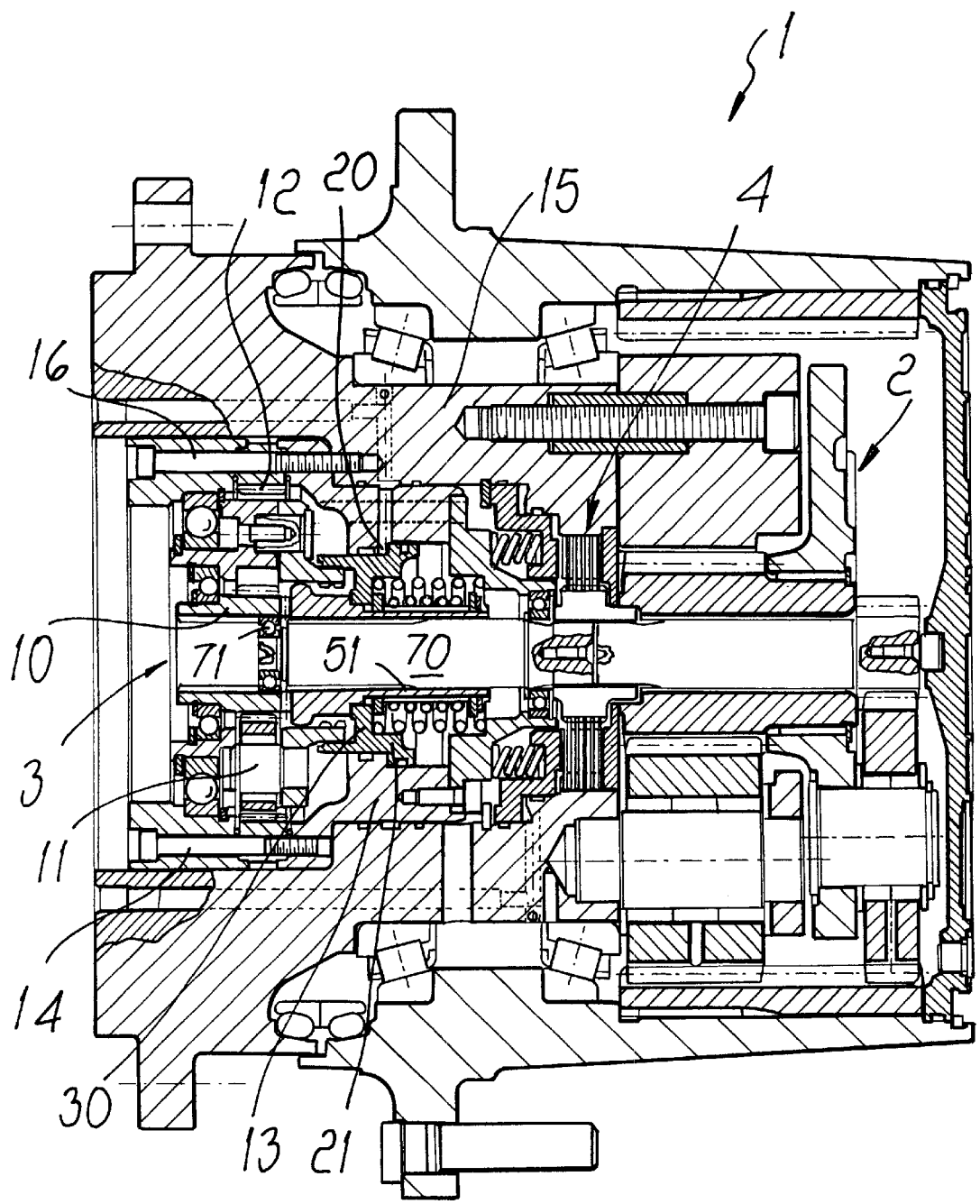
FIG. 1 is a schematic sectional view of the motor wheel according to the invention, with the high speed selected.

With reference to the figures, the motor wheel for driving the driving wheel of an industrial vehicle and the like, generally designated by the reference numeral 1, comprises a two-stage rotary-ring reduction unit, generally designated by the reference numeral 2, upstream of which there is a gearbox with epicyclic gear train, generally designated by the reference numeral 3.

A parking brake 4 is interposed between the reduction unit 2 and the gearbox 3 and is located downstream of the gearbox 3 with respect to the motion input.

In greater detail, the gearbox 3 has a sun gear 10 which can be connected to a motion input shaft.

The sun gear 10 meshes with planet gears 11, meshing with a fixed ring gear 12 which is connected to the outer casing 13 of the gearbox assembly, which is provided as a cartridge being assembled, adjusted and tested separately; the gearbox assembly is pre-fitted and assembled by way of the closure screws 14 and is then connected to the hub 15 of the wheel 1 by fitting screws, designated by the reference numeral 16.

The gearbox assembly internally defines a chamber 20 in which a piston 21 can move; said piston is adapted to interact with a sleeve 22 having front teeth 23, which can couple to corresponding complementary teeth 24 formed by the sun gear 10, and circumferential teeth 25, which can couple to corresponding circumferential complementary teeth 26 formed by the carrier 27.

The piston 21 defines a shoulder 30 against which a pusher spring 31 acts; said spring acts, at its other end, against a fixed shoulder 32 which is defined by a bottom 33 which is rigidly coupled to the casing 13.

Inside the pusher spring 31 there is also a compensation spring 40, acting between a retention washer 50, which is retained at the end of the stem 51 of the sleeve 22 by a retention ring 52, and a sliding washer 53 interacting against an internal abutment 54 of the shoulder 30 and a locator 55 formed on the sleeve 22.

It should also be noted that the shoulder 30 of the piston engages, on the opposite side with respect to the internal abutment 54, a recess 61 formed on the sleeve 22.

Figure 2:
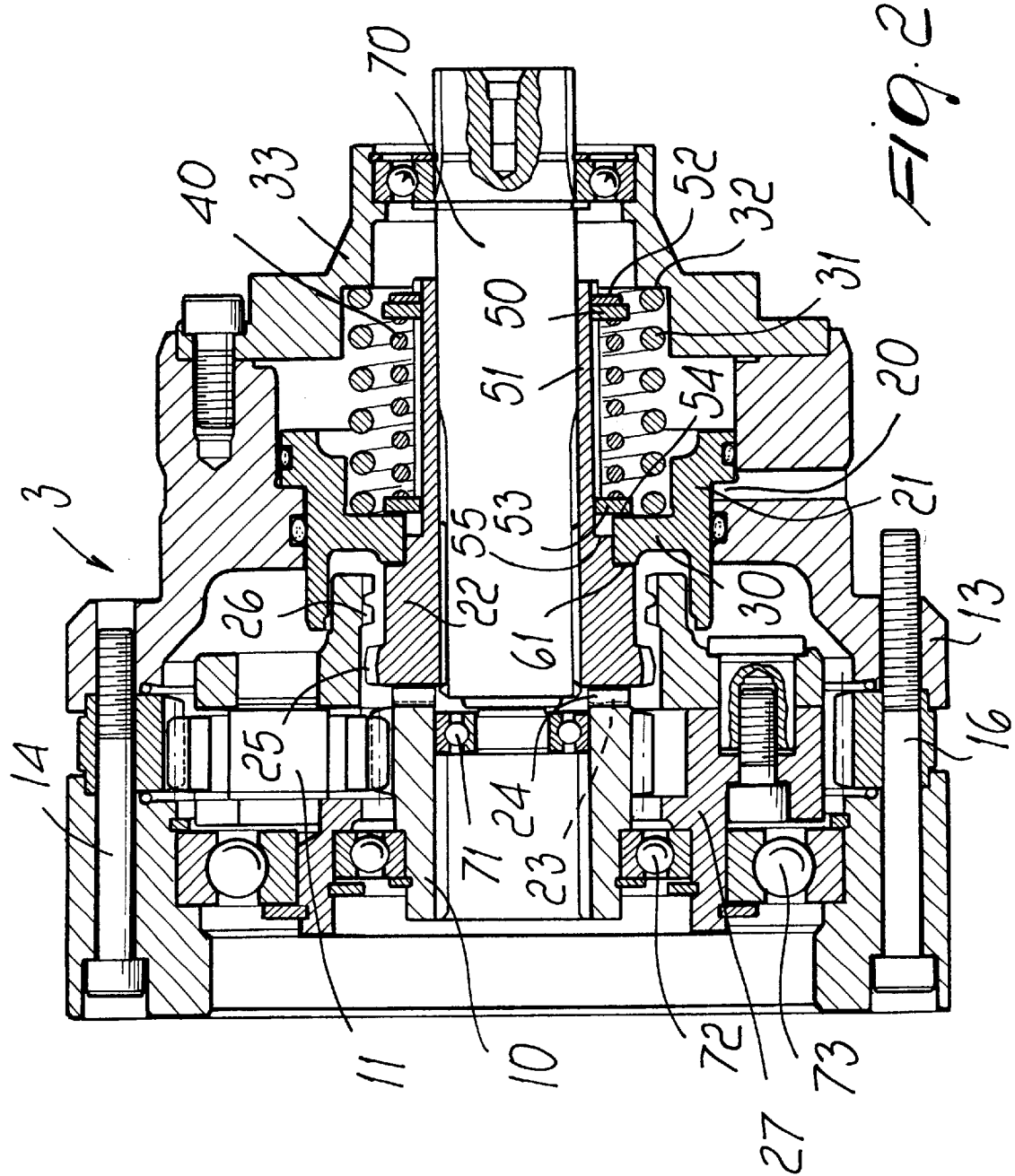
FIG. 2 is a detail view of the gearbox with the high speed selected.
Figure 3:
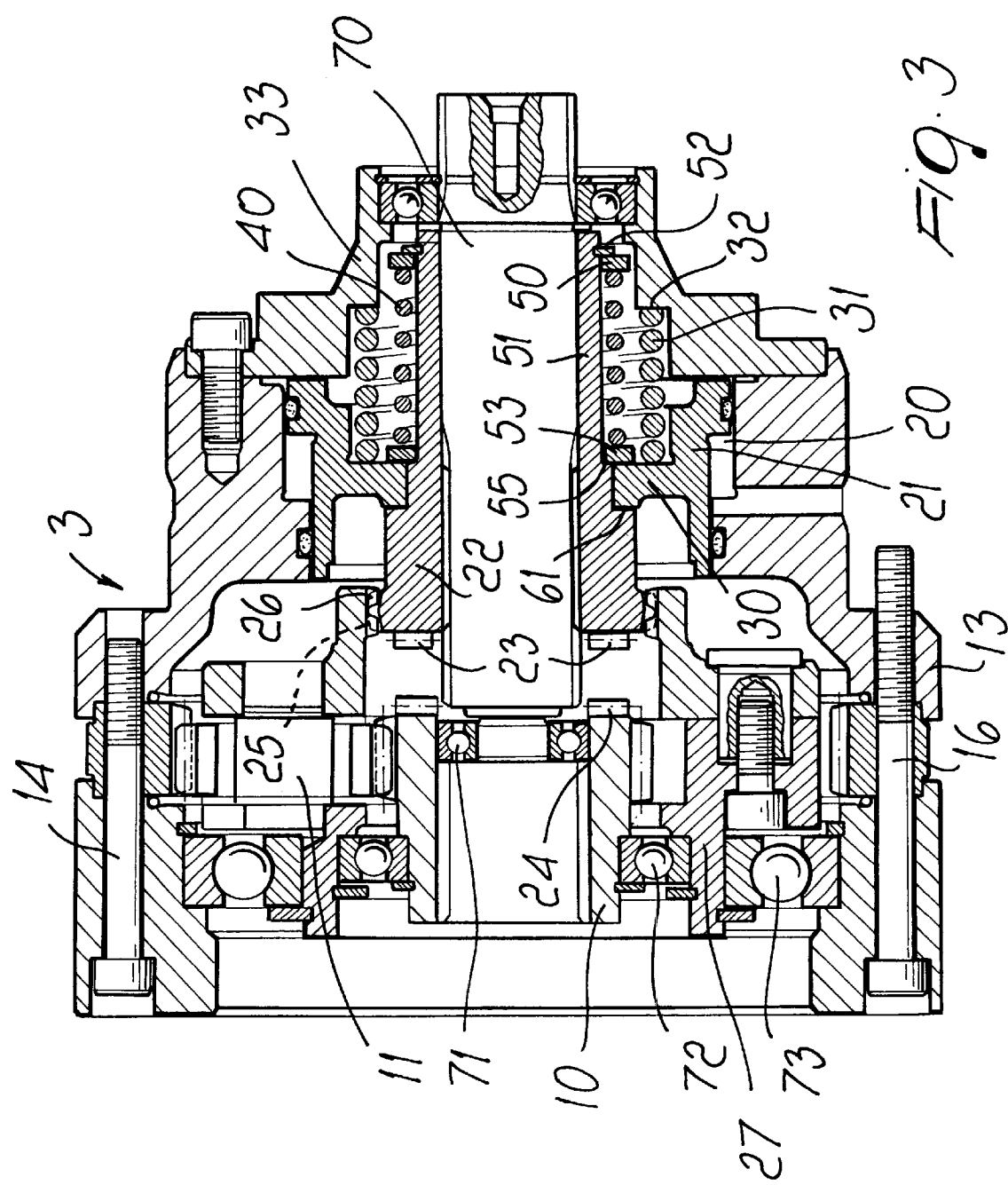
FIG. 3 is a view of the gearbox with the low speed selected.

With the described arrangement, if there is no pressure in the chamber 20 (FIG. 2), the spring 31 pushes the piston 21 (to the left with reference to the drawings), which in turn pushes the sleeve 22, moving the front teeth 23, machined with a considerable circumferential backlash, toward the complementary teeth 24, which as a consequence of small relative rotations of the elements of the assembly mate with the teeth 23, achieving the coupling, which in practice is actuated by the spring 31.

The high speed is provided in these conditions, because the motion is taken directly from the sun gear and the shaft 70, which is rigidly coupled to the sleeve 22 and engages the sun gear 10 through the interposed bearing 71, is turned.

When pressure is fed into the chamber 20, the piston 21, by overcoming the load of the spring 31, moves to the right (with reference to the drawings) and by way of the movable washer 53 loads the compensation spring 40, which in practice applies to the sleeve a traction load causing a translatory motion until the circumferential teeth 25 engage the circumferential complementary teeth 26.

As described for the front complementary teeth, the circumferential complementary teeth also are machined with considerable circumferential backlash, so that it is possible to achieve easy meshing as soon as small movements occur.

In any case, the compensation spring is pre-loaded and completes the translatory motion of the sleeve when it becomes possible.

It should be noted that the washers 53 and 50 can slide with respect to the sleeve but rotate rigidly with respect to said sleeve.

With the described arrangement, a temporary neutral position is always provided during speed shifting; however, said position is not stable, since if there is no pressure in the circuits that supply the chamber 20 the spring 31 makes the sleeve mate with the sun gear.

When shifting from the high speed to the low speed, the actuation pressure initially passes from the normal value of the counterpressure that remains in the circuit, which is for example 5 bar, to an actuation value, which is for example 20 bar; in the least favorable case, in which the front teeth remain coupled to the front complementary teeth, the movement of the piston 21 would be converted into a pre-loading of the springs 31 and 40, so that as soon as meshing ceases the sleeve is moved by the springs until the low speed is engaged; this condition eliminates the load on the compensation spring 40, which is confined between the abutments 52 and 55 by means of the washers 50 and 53.

When shifting from the low speed to the high speed, the actuation pressure passes from 20 to 5 bar and the hydraulic load on the piston is reduced significantly, so that the piston and the sleeve move to the left, being moved by the thrust applied by the spring 31; the load due to the counterpressure of the actuation circuit must be subtracted from said thrust, until meshing occurs; in this step, the compensation spring 40 does not intervene.

As noted, a parking brake is provided between the two-stage reduction unit 2 and the gearbox; said parking brake is of the negative-actuation type and is therefore normally engaged. Moreover, by arranging the brake downstream of the gearbox, the braking effect is not influenced by any malfunctions of the gearbox, thus improving safety.

It should also be noted, as already mentioned, that the neutral condition is only transient and that even if the hydraulic actuation system fails the engagement of the high speed is still ensured, thus improving safety.

Moreover, the front teeth, which preferably have a dovetail shape, and the circumferential teeth, which have a double-cusp shape, allow the engagement to be always positive; this ensures that accidental disengagement cannot occur when torque is being transmitted.

Moreover, by virtue of the engagement system, during operating with torque applied, the axial loads are balanced within said coupling teeth, without reaching the region of the groove between the sleeve and the piston, thus preventing any possible wear thereof.

It should also be added that bearings 72 and 73 are provided being respectively arranged between the sun gear 10 and the carrier 27 and between the carrier 27 and the casing 13; said bearings are designed to axially rigidly couple the carrier and the sun gear and to support the axial loads that are exchanged between the coupling teeth before coupling actually occurs.

Moreover, the bearing 72 has a considerable radial backlash, so as to allow a certain degree of radial freedom for the sun gear yet ensure its axial retention.

The bearing 71 ensures concentricity between the sleeve 22, the input sun gear and the carrier and accordingly ensures the correct operation of the coupling teeth 23, 24 and 25, 26.

From the above description it is thus evident that the invention achieves the intended aim and objects, and in particular that a motor wheel is provided in which it is possible to provide preselection by way of the presence of a single piston and without having to resort to the presence of the two clutches, with the previously noted mechanical and practical operating problems.

The invention thus conceived is susceptible of numerous modifications and variations, all of which are within the scope of the appended claims.

All the details may further be replaced with other technically equivalent elements.

In practice, the materials employed, as well as the contingent shapes and dimensions, may be any according to requirements.

The disclosures in Italian Patent Application No. MI99A002636 from which this application claims priority are incorporated herein by reference.

What is claimed is:

1. A motor wheel for driving the driving wheel of an industrial vehicle, comprising: a motion input; a two-stage rotary-ring reduction unit; a gearbox with a fixed-ring epicyclic gear train mounted upstream of said reduction unit, said gearbox having at least two positions which respectively correspond to a high or travel speed and to a low or working speed; and a parking brake provided downstream of said gearbox with respect to the motion input.

2. The motor wheel according to claim 1, wherein said gearbox comprises: an outer casing; a fixed ring gear connected to said outer casing; a sun gear which is connectable to the motion input; planet gears engaging said sun gear and meshing with said fixed ring gear.

3. The motor wheel of claim 2, further comprising: a sleeve provided with front teeth and with circumferential teeth; a chamber which is formed in said gearbox and interacts with said sleeve; a piston located inside said outer casing movable in said chamber; complementary teeth formed by said sun gear, said front teeth being adapted to couple to corresponding ones of said complementary teeth, and circumferential complementary teeth formed by said carrier, said circumferential teeth being adapted to couple with corresponding ones of said circumferential complementary teeth.

4. The motor wheel of claim 3, further comprising: a shoulder formed at said piston; a bottom which is rigidly coupled to said outer casing; a fixed shoulder which is formed by said bottom; and a pusher spring which acts between said shoulder and fixed shoulder.

5. The motor wheel of claim 4, comprising: a stem extending from said sleeve; a retention washer, which is retained at the end of the stem of said sleeve; a locator formed on said sleeve; and a sliding washer interacting against an internal abutment of said piston; and a compensation spring, located inside said pusher spring, which acts between said retention and sliding washers.

6. The motor wheel of claim 5, comprising a recess formed by said sleeve, said shoulder of said piston engaging, on the opposite side with respect to said internal abutment of said piston, said recess.

7. The motor wheel of claim 6, comprising a shaft which is connected to said sleeve; and bearings which are interposed between said shaft and said sun gear.

8. The motor wheel of claim 7, wherein said washers are slideable with respect to said sleeve and rotate jointly with said sleeve.

9. The motor wheel of claim 8, wherein said gearbox has a neutral position between a coupling position between said front teeth and complementary teeth, and a coupling position between said circumferential teeth and complementary teeth.

10. The motor wheel of claim 1, wherein said parking brake is of the negative-actuation type.

11. The motor wheel of claim 9, comprising additional bearings between said carrier and said sun gear and further bearings between said carrier and said ring gear.

* * * * *